US012261329B2

(12) United States Patent
Gu et al.

(10) Patent No.: US 12,261,329 B2
(45) Date of Patent: Mar. 25, 2025

(54) BATTERY CELL, METHOD AND APPARATUS FOR MANUFACTURING THE SAME, BATTERY, AND ELECTRIC APPARATUS

(71) Applicant: CONTEMPORARY AMPEREX TECHNOLOGY (HONG KONG) LIMITED, Hong Kong (CN)

(72) Inventors: Hui Gu, Ningde (CN); Linlin Zhu, Ningde (CN); Guanghao Zhu, Ningde (CN); Chao Liu, Ningde (CN); Wenjie Yu, Ningde (CN); Qingkui Chi, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/608,743

(22) Filed: Mar. 18, 2024

(65) Prior Publication Data
US 2024/0222826 A1 Jul. 4, 2024

Related U.S. Application Data

(63) Continuation of application No. PCT/CN2022/074309, filed on Jan. 27, 2022.

(51) Int. Cl.
H01M 50/636 (2021.01)
H01M 10/04 (2006.01)
(Continued)

(52) U.S. Cl.
CPC ..... H01M 50/636 (2021.01); H01M 10/0422 (2013.01); H01M 50/103 (2021.01);
(Continued)

(58) Field of Classification Search
None
See application file for complete search history.

(56) References Cited

U.S. PATENT DOCUMENTS

2002/0110729 A1  8/2002  Hozumi et al.
2019/0379019 A1  12/2019 Fukuda et al.
(Continued)

FOREIGN PATENT DOCUMENTS

CN      214043810 U    8/2021
WO   2013024774 A1    2/2013

OTHER PUBLICATIONS

International Search Report for PCT application No. PCT/CN2022/074309, dated Oct. 10, 2022.
(Continued)

Primary Examiner — Scott J. Chmielecki
(74) Attorney, Agent, or Firm — Ladas & Parry, LLP

(57) ABSTRACT

The present application relates to a battery cell and a manufacturing method and device thereof, a battery, and a power consumption apparatus, belonging to the field of battery manufacturing technologies. The battery cell includes: a shell with a first wall; an electrode assembly; and a first current collecting member, where the first wall has a first surface facing the first current collecting member, the first current collecting member has a second surface facing the first wall, one of the first surface and the second surface is provided with a protrusion and the other abuts against the protrusion to form a gap between the first wall and the first current collecting member; and the first current collecting member is provided with a first hole and a second hole, and the first hole is configured to be in communication with the second hole through the gap.

15 Claims, 9 Drawing Sheets

(51) Int. Cl.
*H01M 50/103* (2021.01)
*H01M 50/538* (2021.01)
*H01M 50/578* (2021.01)

(52) U.S. Cl.
CPC ....... *H01M 50/538* (2021.01); *H01M 50/578* (2021.01); *H01M 2220/20* (2013.01)

(56) References Cited

U.S. PATENT DOCUMENTS

| | | |
|---|---|---|
| 2021/0203044 A1 | 7/2021 | Jeong et al. |
| 2022/0149421 A1* | 5/2022 | Fang ................... H01M 50/543 |
| 2022/0200108 A1* | 6/2022 | Kim .................... H01M 50/538 |
| 2022/0285764 A1* | 9/2022 | Kim .................... H01M 50/591 |

OTHER PUBLICATIONS

Written Opinion of International Searching Authority for PCT application No. PCT/CN2022/074309, dated Oct. 10, 2022.

* cited by examiner

BATTERY CELL, METHOD AND APPARATUS FOR MANUFACTURING THE SAME, BATTERY, AND ELECTRIC APPARATUS

CROSS REFERENCE TO RELATED APPLICATION

This application is a continuation of International Patent Application No. PCT/CNCN2022/074309, filed on Jan. 27, 2022, which is incorporated by reference in its entirety.

TECHNICAL FIELD

The present application relates to the field of battery manufacturing technologies, and particularly to a battery cell and a manufacturing method and device thereof, a battery, and a power consumption apparatus.

BACKGROUND

At present, with the continuous prosperity of the new energy vehicle market, the rapid expansion and growth of the power battery industry and the increasing improvement of the lithium battery technology put forward higher requirements for the safety performance, energy density, and industrialization of battery cells.

In an assembly process of battery cells, an electrolyte is injected into the battery cells to infiltrate electrode assemblies. At present, low injection efficiency of battery cells and poor infiltrating effect of electrode assemblies result in low electric capacity and poor safety performance of the battery cells.

SUMMARY

To this end, the present application provides a battery cell and a manufacturing method and device thereof, a battery, and a power consumption apparatus, in which an electrolyte can quickly and fully infiltrate an electrode assembly, thereby improving the injection efficiency of the battery cell and improving the electric capacity and safety performance of the battery cell.

An embodiment in a first aspect of the present application provides a battery cell, including: a shell with a first wall; an electrode assembly disposed inside the shell, where the electrode assembly has a center hole, and a first tab is provided on a side, facing the first wall, of the electrode assembly; and a first current collecting member disposed between the first wall and the electrode assembly and used for connecting the first tab and the first wall, where the first wall has a first surface facing the first current collecting member, the first current collecting member has a second surface facing the first wall, one of the first surface and the second surface is provided with a protrusion and the other abuts against the protrusion to form a gap between the first wall and the first current collecting member; and the first current collecting member is provided with a first hole and a second hole, the first hole is opposite to the center hole, the second hole is opposite to the first tab, and the first hole is configured to be in communication with the second hole through the gap.

Due to the gap between the first wall and the first current collecting member, when an electrolyte is injected into the battery cell, the electrolyte enters the center hole, enters the gap through the first hole, and then enters the first tab from the gap to fully and quickly infiltrate the electrode assembly, which not only improves the injection efficiency of the battery cell, but also enables the electrode to fully infiltrate the electrode assembly to improve the electric capacity and safety performance of the battery cell.

According to some embodiments of the present application, there is a plurality of protrusions spaced around the center hole.

In the foregoing solution, the plurality of protrusions are spaced around the center hole, and can evenly abut between the first current collecting member and the first wall around the center hole.

According to some embodiments of the present application, there is a plurality of second holes spaced around the center hole.

In the foregoing solution, the plurality of second holes are spaced around the center hole, which can guide the electrolyte to evenly diffuse around the center hole to fully enter the first tab, so that the electrolyte fully and quickly infiltrates the electrode assembly.

According to some embodiments of the present application, a projection of the protrusion on the first current collecting member does not overlap with the second hole.

In the foregoing solution, portions where the second holes are formed are staggered with portions where the protrusions are formed in the first current collecting member, which can guide the electrolyte smoothly into the second holes without reducing the strength of the portions corresponding to the protrusions, thereby reliably forming the gap between the first current collecting member and the first wall.

According to some embodiments of the present application, the first wall is provided with a third hole, the first current collecting member includes a center portion and a surrounding portion, the surrounding portion surrounds the center portion, the center portion protrudes from the surrounding portion in a direction away from the electrode assembly, at least a portion of the center portion is inserted into the third hole, and the center portion is connected to a wall of the third hole.

In the foregoing solution, at least a portion of the center portion is connected to the wall of the third hole, so that the first current collecting member can be electrically connected to the first wall through the coordination between the center portion and the third hole.

According to some embodiments of the present application, the center portion includes a top wall and a side wall, the side wall is disposed on a periphery of the top wall, the side wall connects the surrounding portion and the top wall, the first hole is disposed on the side wall and in communication with the gap, and a peripheral surface of the side wall is connected to the wall of the third hole.

In the foregoing solution, the first hole is disposed on the side wall of the center portion, and the electrolyte in the center hole enters the gap radially along the center hole through the first hole to fully and quickly infiltrate the electrode assembly.

According to some embodiments of the present application, a ratio of a diameter of the center portion to a diameter of the first current collecting member is greater than or equal to 0.3.

In the foregoing solution, the ratio of the diameter of the center portion to the diameter of the first current collecting member is greater than or equal to 0.3, which can achieve a good overcurrent capacity when the center portion is attached to the wall of the third hole, and achieve a reliable electrical connection between the first current collecting member and the first wall.

According to some embodiments of the present application, the shell further includes a second wall opposite to the first wall, a second tab is disposed on a side, facing the second wall, of the electrode assembly, and the battery cell further includes an electrode terminal which is insulated on the second wall and electrically connected to the second tab.

In the foregoing solution, the electrode terminal is insulated on the second wall, the electrode terminal and the first wall are located on two opposite sides of the shell separately, and the battery cell is electrically connected to the outside through the electrode terminal.

According to some embodiments of the present application, the battery cell further includes a second current collecting member, which is disposed between the electrode assembly and the second wall and used for connecting the second tab and the electrode terminal.

In the foregoing solution, the second tab is connected to the electrode terminal through the second current collecting member, which can simplify the structure of the electrode terminal and the assembly process of the electrical connection between the second tab and the electrode terminal.

According to some embodiments of the present application, the electrode terminal is provided with a liquid injection hole, which is opposite to the center hole.

In the foregoing solution, the liquid injection hole is integrated at the electrode terminal, which can simplify the structure of the shell; and the liquid injection hole and the gap are located on two axial sides of the center hole separately, and the electrolyte entering the center hole from the liquid injection hole may first diffuse to the electrode assembly through the center hole and then enter the electrode assembly through the gap, thereby improving the infiltration efficiency of the electrolyte.

According to some embodiments of the present application, the battery cell further includes a sealing member for sealing the liquid injection hole.

In the foregoing solution, after the electrolyte is injected, the sealing member is used to seal the liquid injection hole, which can ensure the sealing property of the battery cell and improve the safety performance of the battery cell.

According to some embodiments of the present application, the battery cell further includes a pressure relief portion disposed on the first wall, and the pressure relief portion is configured to activate when the temperature or pressure inside the battery cell reaches a threshold, so as to release the pressure inside the battery cell.

In the foregoing solution, the pressure relief portion is disposed on the first wall to improve the safety performance of the battery cell.

According to some embodiments of the present application, the shell includes a shell body and an end cover, the shell body has an opening, the end cover covers the opening, and the first wall is the end cover.

In the foregoing solution, the first wall is the end cover, and the first current collecting member is disposed between the electrode assembly and the end cover, whereby the electrode assembly and the first current collecting member assembled into a whole can be placed in the shell body first, then the opening is closed by the end cover, and the assembly process of the battery cell is simplified accordingly.

An embodiment in a second aspect of the present application provides a battery, including the battery cell described in the embodiment in the first aspect of the present application.

An embodiment in a third aspect of the present application provides a power consumption apparatus, including a battery described in the embodiment in the second aspect of the present application.

An embodiment in a fourth aspect of the present application provides a battery cell manufacturing method, including:

providing a shell body and an electrode terminal, where the electrode terminal is insulated and mounted on the shell body, the shell body has an opening, and the electrode terminal is provided with a liquid injection hole;

providing an end cover;

providing an electrode assembly, where the electrode assembly has a center hole, and a first tab is provided at one end of the electrode assembly;

providing a first current collecting member provided with a first hole and a second hole;

connecting the first current collecting member to the first tab, placing the electrode assembly into the shell body, and covering the opening with the end cover, so that the first current collecting member is located between the end cover and the electrode assembly, where the end cover has a first surface facing the first current collecting member, the first current collecting member has a second surface facing the end cover, one of the first surface and the second surface is provided with a protrusion and the other abuts against the protrusion to form a gap between the end cover and the first current collecting member, the first hole is opposite to the center hole, the second hole is opposite to the first tab, and the first hole is configured to be in communication with the second hole through the gap; and injecting an electrolyte into the interior of the shell body through the liquid injection hole, so that the electrolyte enters the center hole, enters the gap through the first hole, and then enters the electrode assembly through the gap.

An embodiment in a fifth aspect of the present application provides a battery cell manufacturing device, including:

a first provision apparatus, configured to provide a shell body and an electrode terminal, where the electrode terminal is insulated and mounted on the shell body, the shell body has an opening, and the electrode terminal is provided with a liquid injection hole;

a second provision apparatus, configured to provide an end cover;

a third provision apparatus, configured to provide an electrode assembly, where the electrode assembly has a center hole, and a first tab is provided at one end of the electrode assembly;

a fourth provision apparatus, configured to provide a first current collecting member provided with a first hole and a second hole;

a first assembly module, configured to connect the first current collecting member to the first tab, place the electrode assembly into the shell body, and cover the opening with the end cover, so that the first current collecting member is located between the end cover and the electrode assembly, where the end cover has a first surface facing the first current collecting member, the first current collecting member has a second surface facing the end cover, one of the first surface and the second surface is provided with a protrusion and the other abuts against the protrusion to form a gap between the end cover and the first current collecting member, the first hole is opposite to the center hole, the second hole is opposite to the first tab, and the first hole is configured to be in communication with the second hole through the gap; and a second assembly module, configured to inject an electrolyte into the interior of the shell body through the liquid injection hole, so that the electrolyte enters the center hole, enters the gap through the first hole, and then enters the electrode assembly through the gap.

Some of the additional aspects and advantages of the present application will be provided in the following description, and some will become apparent from the following description, or be learned by practice of the present application.

BRIEF DESCRIPTION OF DRAWINGS

In order to illustrate the technical solutions in the embodiments of the present application more clearly, brief description will be made below to the drawings required in the embodiments. It should be understood that the following drawings show only some embodiments of the present application and should not be regarded as limiting the scope, and other relevant drawings may be obtained based on these drawings by those of ordinary skill in the art without any creative efforts.

Figure 1:
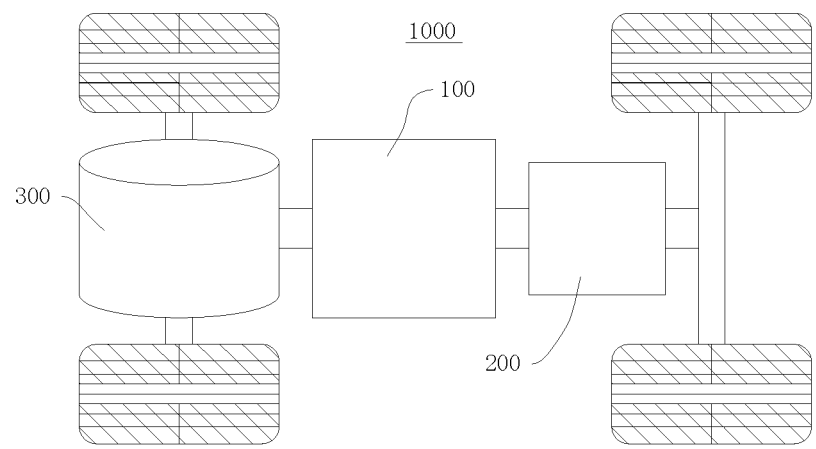
FIG. 1 shows a simple schematic diagram of a vehicle in an embodiment of the present application.

The drawings are not drawn to actual scale.

REFERENCE NUMERALS

1000—vehicle;
100—battery;
10—battery cell;
11—shell;
111—first wall;
1111—first surface;
1112—third hole;
112—second wall;
113—third wall;
12—electrode assembly;
121—main body;
122—first tab;
123—second tab;
124—center hole;
1241—first end;
1242—second end;
13—electrode terminal;
131—liquid injection hole;
132—insulating ring;
14—first current collecting member;
141—second surface;
142—first hole;
143—second hole;
144—center portion;
1441—top wall;
1442—side wall;
14421—first portion;
14422—second portion;
145—surrounding portion;
15—second current collecting member;
16—pressure relief portion;
17—sealing member;
18—protrusion;
19—gap;
20—box body;
21—first box body;
22—second box body;
200—controller;
300—motor;
2000—battery cell manufacturing device;
2100—first provision apparatus;
2200—second provision apparatus;
2300—third provision apparatus;
2400—fourth provision apparatus;
2500—first assembly module;
2600—second assembly module.

DETAILED DESCRIPTION

In order to make the objectives, technical solutions and advantages of the embodiments of the present application clearer, the technical solutions in the embodiments of the present application will be described clearly below with reference to the drawings in the embodiments of the present application. Apparently, the described embodiments are some of the embodiments of the present application, not all of them. All other embodiments obtained by those of ordinary skill in the art based on the embodiments of the present application without creative efforts shall fall within the protection scope of the present application.

Unless otherwise defined, all technological and scientific terms used in the present application have the same meanings as those commonly understood by those skilled in the art to which the present application belongs. The terms used in the specification of the present application are merely for the purpose of describing specific embodiments, but are not intended to limit the present application. The terms "including" and "having" and any variations thereof in the specification and claims of the present application as well as the brief description of the drawings described above are intended to cover non-exclusive inclusion. In the specification and claims of the present application or in the foregoing drawings, the terms "first", "second", and the like are used to distinguish different objects and are not used to describe a specific sequence or a primary and secondary relation.

The phrase "embodiment" referred to in the present application means that specific features, structures, or characteristics described in conjunction with the embodiment may be included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the description of the present application, it should be noted that, unless otherwise specified and defined, the terms "mounted", "connected", "connection", and "attached" should be generally understood, for example, the "connection" may be a fixed connection, a detachable connection, an integral connection, a direct connection, or an indirect connection through a medium, or an internal communication of two elements. Those of ordinary skill in the art may appreciate the specific meanings of the foregoing terms in the present application to specific circumstances.

In the present application, the term "a plurality of" means two (inclusive) or more.

In the present application, battery cells may include lithium-ion secondary batteries, lithium-ion primary batteries, lithium-sulfur batteries, sodium lithium-ion batteries, sodium-ion batteries, magnesium-ion batteries, or the like, which are not limited by the embodiments of the present application. The battery cells may be cylindrical, flat, cuboid, or in other shapes, which is also not limited by the embodiments of the present application. The battery cells are generally divided into three types according to the way of packaging: cylindrical battery cells, square battery cells, and soft package battery cells.

The battery mentioned in the embodiments of the present application refers to a single physical module that includes one or more battery cells to provide a higher voltage and capacity. For example, the battery mentioned in the present application may include a battery module or a battery pack. The battery generally includes a box body for packaging one or more battery cells. The box body may prevent liquid or other foreign matters from affecting the charging or discharging of the battery cells.

The battery cell includes an electrode assembly and an electrolyte, and the electrode assembly is composed of a positive electrode sheet, a negative electrode sheet and a separator. The operation of the battery cell mainly relies on the movement of metal ions between the positive electrode sheet and the negative electrode sheet. The positive electrode sheet includes a positive electrode current collector and a positive electrode active material layer. The positive electrode active material layer is coated on a surface of the positive electrode current collector, and the positive electrode current collector not coated with the positive electrode active material layer protrudes from the positive electrode current collector coated with the positive electrode active material layer and is used as a positive electrode tab. In an example of a lithium-ion battery, a material of the positive electrode current collector may be aluminum, and a positive electrode active material may be lithium cobalt oxide, lithium iron phosphate, ternary lithium, lithium manganate oxide, or the like. The negative electrode sheet includes a negative electrode current collector and a negative electrode active material layer. The negative electrode active material layer is coated on a surface of the negative electrode current collector, and the negative electrode current collector not coated with the negative electrode active material layer protrudes from the negative electrode current collector coated with the negative electrode active material layer and is used as a negative electrode tab. A material of the negative electrode current collector may be copper, and a negative electrode active material may be carbon, silicon, or the like. In order to ensure that no fusing occurs when a large current passes through, there is a plurality of positive electrode tabs which are stacked together and a plurality of negative electrode tabs which are stacked together. A material of the separator may be polypropylene (PP), polyethylene (PE), or the like. In addition, the electrode assembly may be of a winding structure or a laminated structure, and the embodiments of the present application are not limited thereto.

The battery cell further includes a current collecting member, which is used for electrically connecting the tab and electrode terminal of the battery cell, so as to transmit electrical energy from the electrode assembly to the electrode terminal, and then to the outside of the battery cell via the electrode terminal. A plurality of battery cells is electrically connected through a converging component to achieve series, parallel, or series and parallel connection of the battery cells.

In related technologies, when an electrolyte is injected into the battery cell, it is difficult for the electrolyte to diffuse after entering a shell, so the injection time is long, the injection efficiency is low, and the electrolyte cannot fully infiltrate the electrode assembly. As a result, electrolyte infiltration of the electrode assembly is poor, and the battery cell is prone to lithium precipitation in charging and discharging processes. Lithium crystal may puncture the separator to short-circuit the positive electrode sheet and the negative electrode sheet, resulting in a short circuit inside the electrode assembly and reduction in the electric capacity and safety performance of the battery cell.

The inventor found through research that the internal structure of the battery cell is usually relatively compact, and close contact between the electrode assembly and the current collecting member, between the current collecting member and the shell, and between the electrode assembly and the shell can reduce the volume of the battery cell and improve the energy density of the battery cell. There is no gap inside the existing battery cell that can guide rapid diffusion of the electrolyte, and the electrolyte diffuses through a gap between two components in close contact after entering the interior of the shell, so the diffusion of the electrolyte is slow and uneven, resulting in low injection efficiency of the battery cell and poor infiltrating effect of the electrode assembly.

Based on the above ideas, the present application provides a novel technical solution, in which the electrolyte can quickly and fully infiltrate the electrode assembly, thereby improving the injection efficiency of the battery cell, enabling the electrolyte to fully infiltrate the electrode assembly, and improving the electric capacity and safety performance of the battery cell.

It may be understood that the battery cell described in the embodiments of the present application may directly supply power to a power consumption apparatus, or form a battery in parallel or series to supply power to various power consumption apparatuses.

It may be understood that the power consumption apparatus described in the embodiments of the present application that uses battery cells, battery modules or batteries may be in various forms, such as mobile phones, portable devices, notebook computers, electro-mobiles, electric vehicles, ships, spacecrafts, electric toys, and electric tools. For example, the spacecrafts include airplanes, rockets, space shuttles, and spaceships; the electric toys include fixed or mobile electric toys, such as game consoles, electric car toys, electric ship toys, and electric aircraft toys; and the electric tools include electric metal cutting tools, electric grinding tools, electric assembly tools, and railway electric tools, such as electric drills, electric grinders, electric wrenches, electric screwdrivers, electric hammers, electric impact drills, concrete vibrators, and electric planers.

The battery cell and battery described in the embodiments of the present application are not only applicable to the power consumption apparatuses described above, but also may be applicable to all power consumption apparatuses using battery cells and batteries. For convenient description, the following embodiments are described by an example of an electric vehicle.

Figure 2:
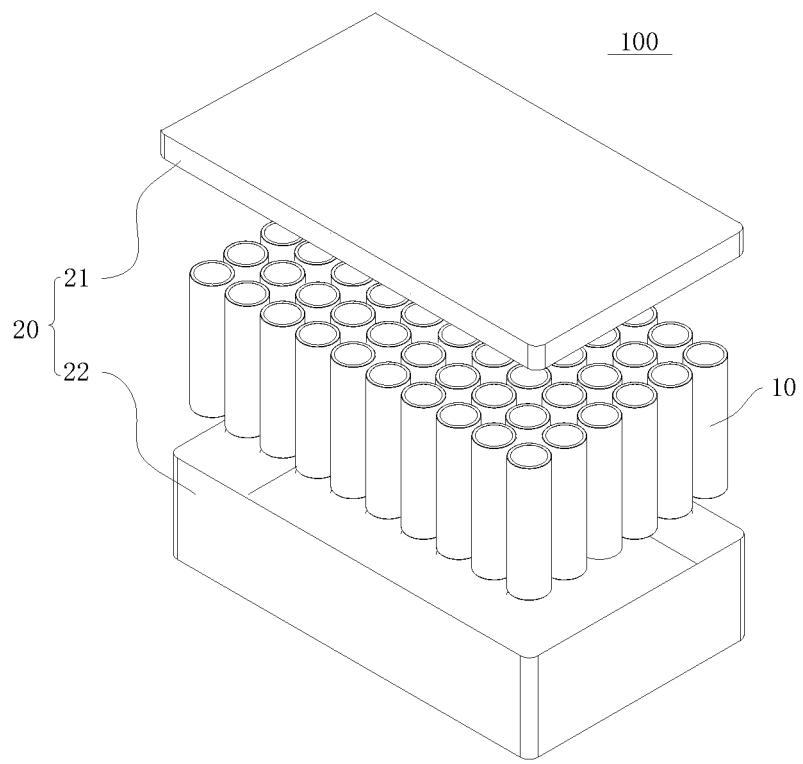
FIG. 2 shows a schematic structural diagram of a battery of the vehicle in FIG. 1.

FIG. 1 shows a simple schematic diagram of a vehicle in an embodiment of the present application; and FIG. 2 shows a schematic structural diagram of a battery of the vehicle in FIG. 1.

As shown in FIG. 1, a battery 100, a controller 200 and a motor 300 are provided inside the vehicle 1000. For example, the battery 100 may be disposed at the bottom, head or tail of the vehicle 1000. The vehicle 1000 may be a fuel-powered vehicle, a gas-powered vehicle or a new energy vehicle, and the new energy vehicle may be a battery electric vehicle, a hybrid vehicle, an extended-range vehicle, or the like.

In some embodiments of the present application, the battery 100 may be used for supplying power to the vehicle 1000. For example, the battery 100 may be used as an operation power supply of the vehicle 1000. The controller 200 is used for controlling the battery 100 to supply power to the motor 300, for example, for the working power demand of the vehicle 1000 during startup, navigation and running.

In other embodiments, the battery 100 may be used not only as an operation power supply of the vehicle 1000, but also as a driving power supply of the vehicle 1000 to replace or partially replace fuel or natural gas to provide driving power for the vehicle 1000.

The battery 100 mentioned in the embodiments of the present application refers to a single physical module that includes one or more battery cells 10 to provide a higher voltage and capacity. A plurality of battery cells 10 may be connected in series, parallel, or series and parallel to directly form the battery 100. The series and parallel connection refers to both series and parallel connection in the plurality of battery cells 10. A plurality of battery cells 10 may alternatively be first connected in series, parallel, or series and parallel to form a battery module, and then a plurality of battery modules are connected in series, parallel, or series and parallel to form the battery 100.

As shown in FIG. 2, the battery 100 includes a plurality of battery cells 10 and a box body 20, where the plurality of battery cells 10 are placed inside the box body 20. The box body 20 includes a first box body 21 and a second box body 22, the first box body 21 and the second box body 22 cover each other to form a battery cavity, and the plurality of battery cells 10 are placed in the battery cavity. Shapes of the first box body 21 and the second box body 22 may be determined by a combined shape of the plurality of battery cells 10, and both the first box body 21 and the second box body 22 may have an opening. For example, the first box body 21 and the second box body 22 may both be hollow cuboid and each has only one opening surface. The openings of the first box body 21 and the second box body 22 are disposed opposite, and the first box body 21 and the second box body 22 are buckled with each other to form the box body 20 with a closed chamber. The plurality of battery cells 10 are connected with each other in parallel, series, or series and parallel and then placed inside the box body 20 formed by buckling the first box body 21 and the second box body 22.

Figure 3:
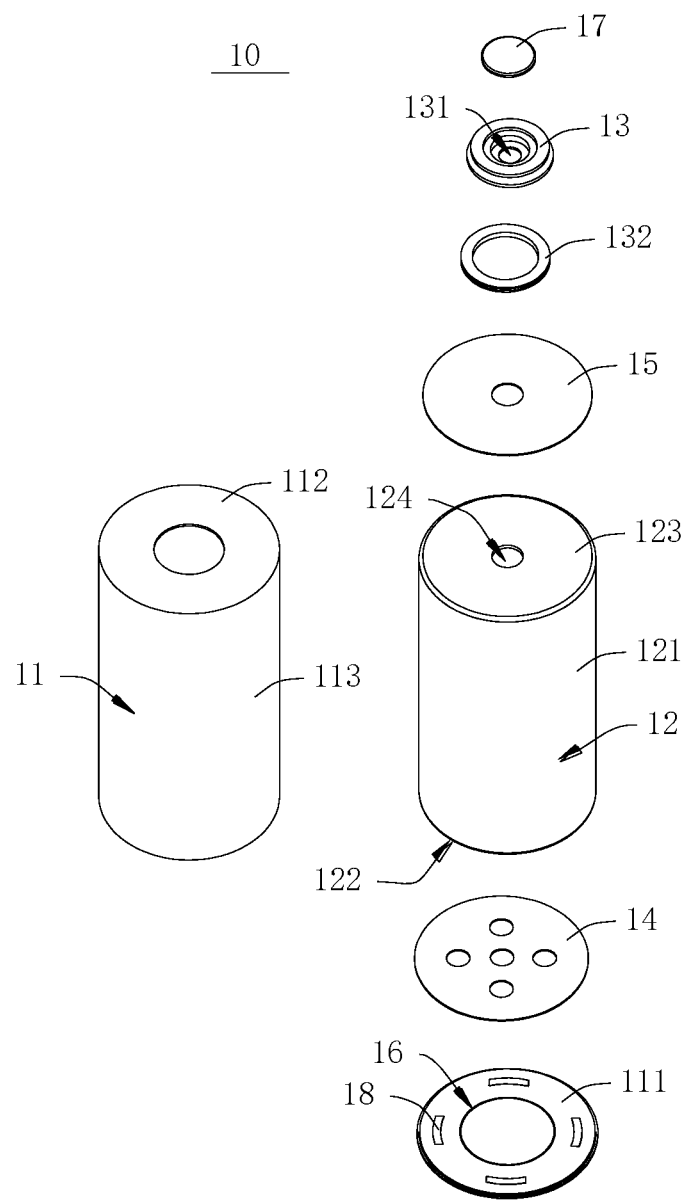
FIG. 3 shows an exploded view of a battery cell according to some embodiments of the present application.
Figure 4:
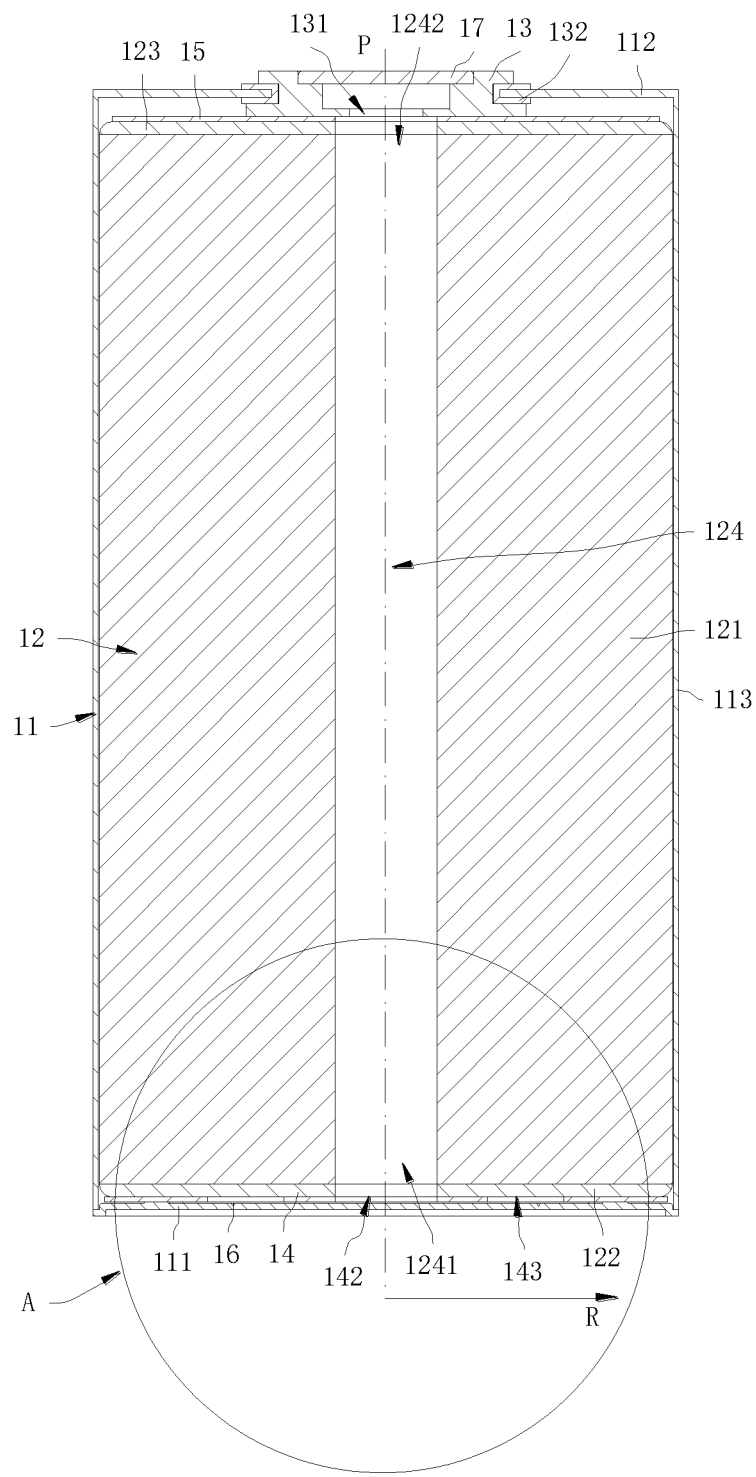
FIG. 4 shows a cross-sectional view of the battery cell in FIG. 3.

FIG. 3 shows an exploded view of a battery cell according to some embodiments of the present application; and FIG. 4 shows a cross-sectional view of the battery cell in FIG. 3.

As shown in FIG. 3 and FIG. 4, the battery cell 10 includes a shell 11, an electrode assembly 12, an electrode terminal 13, a first current collecting member 14, a second current collecting member 15, a pressure relief portion 16, and a sealing member 17.

The shell 11 includes a first wall 111, a second wall 112 and a third wall 113, the first wall 111 and the third wall 113 are disposed opposite, and the second wall 112 connects the first wall 111 and the third wall 113.

Specifically, the shell 11 includes a shell body and an end cover, the shell body has an opening, and the end cover is used for closing the opening to enclose the electrode assembly 12 inside the shell 11.

In some embodiments of the present application, the first wall 111 is the end cover, the second wall 112 and the third wall 113 are integrally formed as the shell body, and the third wall 113 is a bottom wall of the shell body.

In other embodiments, the first wall 111 and the second wall 112 may alternatively be integrally formed as the shell body, the first wall 111 is the bottom wall of the shell body, and the third wall 113 is the end cover.

The shell body may be cylindrical, elliptical, or square. The shell body may be made of a metal material, such as aluminum, aluminum alloy, or nickel-plated steel. The end cover is a plate-like structure, a size and shape of the end cover match those of the opening of the shell body, and the end cover is fixed to the opening of the shell body, thereby sealing the electrode assembly 12 and an electrolyte in an accommodating cavity of the shell body. The end cover is made of a metal material, such as aluminum or steel.

In some embodiments of the present application, the shell body is cylindrical, an axial direction of the shell body extends along a first axis P and a radial direction extends in a first direction R, the first axis P is perpendicular to the first direction R, the end cover is a circular plate structure, and the first wall 111 and the second wall 112 are disposed on two opposite sides of the first axis P separately.

In other embodiments, the shell body may alternatively be square, and the end cover may be a square or rectangular plate structure.

The electrode assembly 12 is disposed inside the shell 11, and includes a main body 121, a first tab 122 and a second tab 123. The main body 121 includes a positive electrode sheet, a negative electrode sheet and a separator, where the separator is located between the positive electrode sheet and the negative electrode sheet to separate the positive electrode sheet and the negative electrode sheet. The electrode assembly 12 is formed by winding, a center hole 124 is the winding center of the electrode assembly 12, and the center hole 124 penetrates the main body 121 along the first axis P. In the extension direction of the first axis P, one end of the center hole 124 corresponds to the first wall 111, and the other end corresponds to the second wall 112.

The first tab 122 and the second tab 123 are located on two sides of the main body 121 separately along the first axis P. The first tab 122 corresponds to the first current collecting member 14, and the second tab 123 corresponds to the second current collecting member 15. In the first tab 122 and the second tab 123, the first tab 122 is a negative tab, and the second tab 123 is a positive tab. A material of the current collecting member corresponding to the first tab 122 is copper, and a material of the current collecting member corresponding to the second tab 123 is aluminum. The first current collecting member 14 is disposed between the first wall 111 and the first tab 122, and the first tab 122 and the first wall 111 are electrically connected through the first current collecting member 14. The electrode terminal 13 is insulated on the second wall 112 through an insulating ring 132, the second current collecting member 15 is disposed between the second wall 112 and the second tab 123, and the second tab 123 and the electrode terminal 13 are electrically connected through the second current collecting member 15.

Thickness directions of both the first current collecting member 14 and the second current collecting member 15 extend along the first axis P. A size and shape of the first current collecting member 14 may match or not match those of the electrode assembly 12. A size and shape of the second current collecting member 15 may match or not match those of the electrode assembly 12.

The first current collecting member 14 is used as an example. In some embodiments of the present application, the battery cell 10 is cylindrical, the electrode assembly 12 is a cylindrical winding body, and the first current collecting member 14 is a circular plate structure with an axis that is the first axis P. In other embodiments, the battery cell 10 may alternatively be of a square battery 100, the electrode assembly 12 is hexagonal or elliptical, and the first current collecting member 14 is a square plate structure extending along the first axis P in the thickness direction.

The pressure relief portion 16 is configured to activate when the temperature or pressure inside the battery cell 10 reaches a threshold, so as to release the pressure inside the battery cell 10.

In some embodiments of the present application, the pressure relief portion 16 is disposed on the first wall 111, that is, the pressure relief portion 16 and the electrode terminal 13 are disposed on two sides of the shell 11 separately along the first axis P, so as to make reasonable use of a surface space of the shell 11.

In other embodiments, the pressure relief portion 16 may alternatively be disposed on the second wall 112, that is, the pressure relief portion 16 and the electrode terminal 13 are disposed on the same side.

The battery cell 10 is further provided with a liquid injection hole 131, the liquid injection hole 131 is used for injecting an electrolyte into the interior of the shell 11, and the sealing member 17 is used for sealing the liquid injection hole 131 after liquid injection is completed. The liquid injection hole 131 may be sealed by a riveting process, and the sealing member 17 is formed after riveting. The sealing member 17 may alternatively be an elastic member made of rubber, silicone, or the like, and the elastic member is inserted into the liquid injection hole 131 to seal the liquid injection hole 131.

In some embodiments of the present application, the liquid injection hole 131 is disposed at the electrode terminal 13, the liquid injection hole 131 is opposite to the center hole 124, and the electrolyte enters one end of the center hole 124 from the liquid injection hole 131 and then diffuses from the other end of the center hole 124 to the electrode assembly 12.

In other embodiments, the liquid injection hole 131 may alternatively be disposed on the second wall 112 or the first wall 111.

Figure 5:
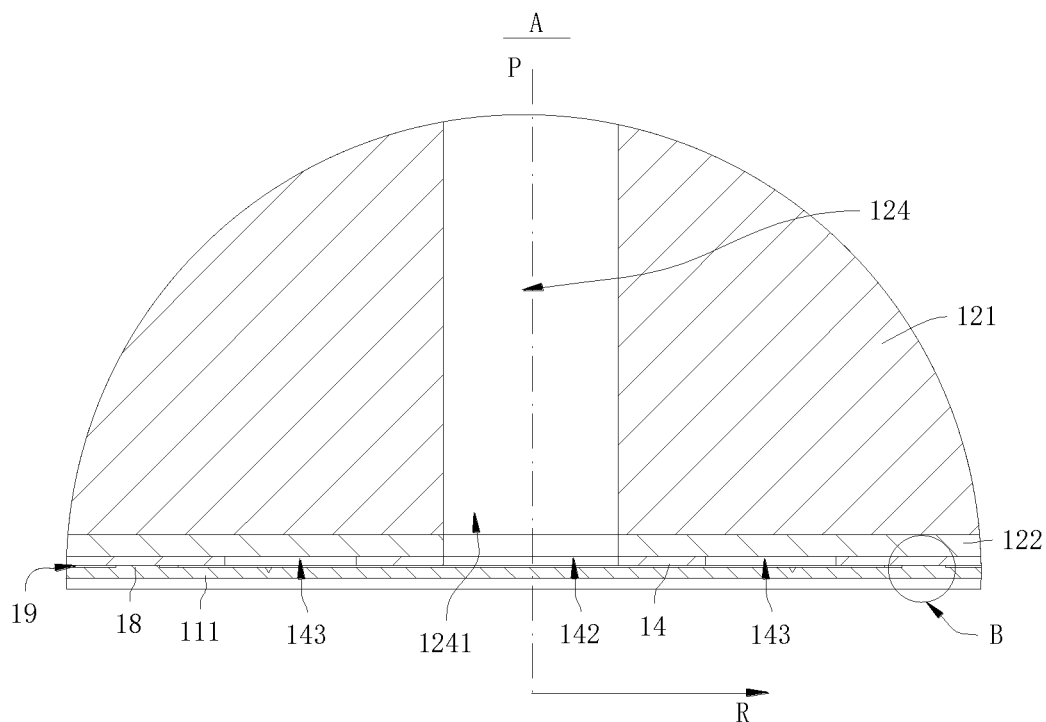
FIG. 5 shows a partially enlarged view of position A in FIG. 4.
Figure 6:
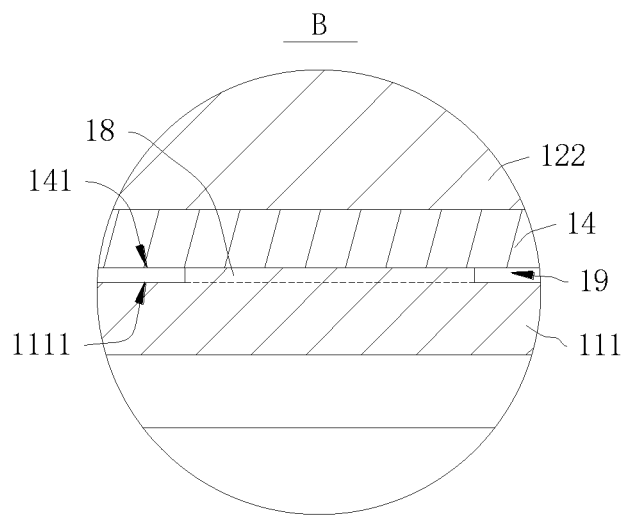
FIG. 6 shows a schematic diagram of a structure with a protrusion disposed on a first surface.
Figure 7:
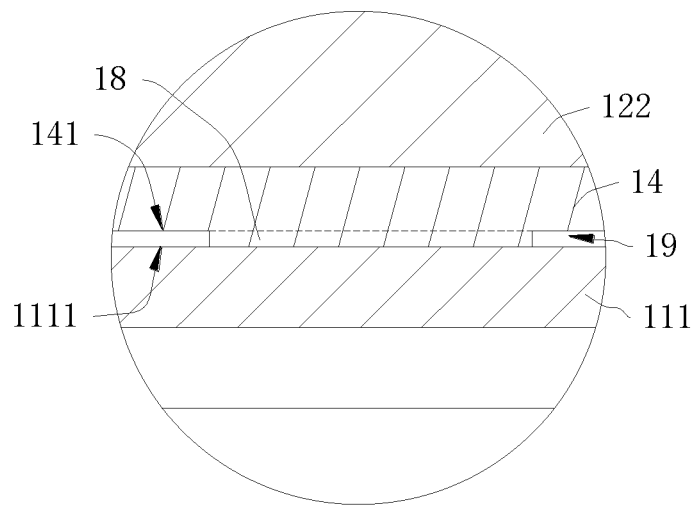
FIG. 7 shows a schematic diagram of a structure with a protrusion disposed on a second surface.

FIG. 5 shows a partially enlarged view of position A in FIG. 4; FIG. 6 shows a schematic diagram of a structure with a protrusion disposed on a first surface; and FIG. 7 shows a schematic diagram of a structure with a protrusion disposed on a second surface.

As shown in FIG. 5 and FIG. 6, some embodiments of the present application provide a battery cell 10, including a shell 11, an electrode assembly 12 and a first current collecting member 14. The shell 11 has a first wall 111, the electrode assembly 12 is disposed inside the shell 11, the electrode assembly 12 has a center hole 124, a first tab 122 is disposed on a side, facing the first wall 111, of the electrode assembly 12, and the first current collecting member 14 is disposed between the first wall 111 and the electrode assembly 12 and used for connecting the first tab 122 and the first wall 111. The first wall 111 has a first surface 1111 facing the first current collecting member 14, the first current collecting member 14 has a second surface 141 facing the first wall 111, one of the first surface 1111 and the second surface 141 is provided with a protrusion 18, and the other abuts against the protrusion 18 to form a gap 19 between the first wall 111 and the first current collecting member 14; and the first current collecting member 14 is provided with a first hole 142 and a second hole 143, the first hole 142 is opposite to the center hole 124, the second hole 143 is opposite to the first tab 122, and the first hole 142 is configured to be in communication with the second hole 143 through the gap 19.

Along the first axis P, two ends of the center hole 124 are a first end 1241 and a second end 1242 separately, and both the first current collecting member 14 and the first wall 111 are located at the first end 1241 of the center hole 124. The first wall 111 may be an end cover or a bottom wall of the shell body; and the first current collecting member 14 may be electrically connected to the first wall 111 in a direct abutment form or through a concave-convex fit structure.

As shown in FIG. 6, in some embodiments of the present application, the protrusion 18 may be disposed on the first surface 1111, and a top surface of the protrusion 18 abuts against the second surface 141 to form the gap 19 between the first wall 111 and the first current collecting member 14. As shown in FIG. 7, in other embodiments of the present application, the protrusion 18 may alternatively be disposed on the second surface 141, and the top surface of the protrusion 18 abuts against the first surface 1111 to form the gap 19 between the first wall 111 and the first current collecting member 14.

There may be one protrusion 18, and the protrusion 18 abuts between the first surface 1111 and the second surface 141 to form the gap 19 between the first wall 111 and the first current collecting member 14; or there may be a plurality of protrusions 18, which have the same height (namely, a size in the direction of the first axis P) and jointly abut between the first surface 1111 and the second surface 141 to form the gap 19 between the first wall 111 and the first current collecting member 14. In the embodiment wherein there is a plurality of protrusions 18, the plurality of protrusions 18 may all be disposed on the first surface 1111 or the second surface 141, or some protrusions 18 may be disposed on both the first surface 1111 and the second surface 141.

The protrusions 18 may be triangular, circular, arc-shaped, or the like; and the protrusions 18 may be arranged in a ring array, square array, triangular array, or the like.

The first hole 142 is opposite to the center hole 124 in that an electrolyte may enter the first hole 142 from the first end 1241 of the center hole 124. An axial direction of the first hole 142 may coincide or approximately coincide with the center hole 124, and a flow direction of the electrolyte entering the first hole 142 from the first end 1241 of the center hole 124 hardly changes; or the axial direction of the first hole 142 may alternatively be perpendicular or approximately perpendicular to the center hole 124, and the flow direction of the electrolyte entering the first hole 142 from the first end 1241 of the center hole 124 significantly changes.

There may be one first hole 142, and all the electrolyte in the center hole 124 enters the gap 19 from the first hole 142; or there may be a plurality of first holes 142 which are spaced around the first axis P, and the electrolyte in the center hole 124 enters the plurality of first holes 142 simultaneously and then diffuses in the first direction R.

The second hole 143 is opposite to the first tab 122 in that the second hole 143 falls within a projection range of the first tab 122 on a plane perpendicular to the first axis P, and the electrolyte flowing out of the second hole 143 may enter the first tab 122 and then enter the electrode assembly 12.

There may be one second hole 143, and all the electrolyte in the gap 19 enters the first tab 122 from the second hole 143; or there may be a plurality of second holes 143 which are spaced around the first axis P, and the electrolyte in the gap 19 enters the plurality of second holes 143 simultaneously to evenly and quickly infiltrate the electrode assembly 12.

Due to the gap 19 between the first wall 111 and the first current collecting member 14, when the electrolyte is injected into the battery cell 10, the electrolyte enters the center hole 124, enters the gap 19 through the first hole 142, and then enters the first tab 122 from the gap 19 to fully and quickly infiltrate the electrode assembly 12, which not only improves the injection efficiency of the battery cell 10, but also improves the electric capacity and safety performance of the battery cell 10.

Figure 8:
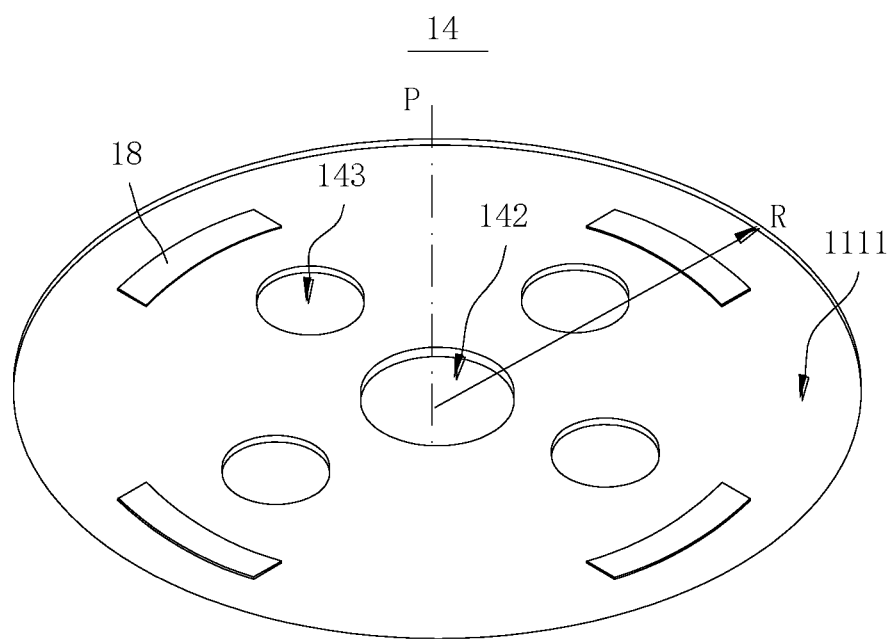
FIG. 8 shows a schematic structural diagram of a form of first current collecting member of a battery cell according to some embodiments of the present application.

FIG. 8 shows a schematic structural diagram of a form of first current collecting member of a battery cell according to some embodiments of the present application.

As shown in FIG. 8, in some embodiments of the present application, there is a plurality of protrusions 18 spaced around the center hole 124.

Specifically, the plurality of protrusions 18 are spaced around the first axis P. The plurality of protrusions 18 may all be located on the same circumference around the first axis P. For example, as shown in FIG. 8, there are four protrusions 18 disposed in a ring shape around the first axis P. The plurality of protrusions 18 may alternatively be arranged in a plurality of ring arrays in the first direction R. For example, there are eight protrusions 18, among which four protrusions 18 are disposed in a ring array around the first axis P, and the other four protrusions 18 are also disposed in a ring array on an outer ring of the four protrusions 18.

In the foregoing solution, the plurality of protrusions 18 are spaced around the center hole 124, and can evenly abut between the first current collecting member 14 and the first wall 111 around the center hole 124.

As shown in FIG. 8, in some embodiments of the present application, there is a plurality of second holes 143 spaced around the center hole 124.

The second holes 143 may be triangular, circular, arc-shaped, or the like. The plurality of second holes 143 are spaced around the first axis P.

The plurality of second holes 143 may all be located on the same circumference around the first axis P. For example, as shown in FIG. 8, there are four second holes 143 disposed in a ring shape around the first axis P. The plurality of second holes 143 may alternatively be arranged in a plurality of ring arrays in the first direction R. For example, there are eight second holes 143, among which four second holes 143 are disposed in a ring array around the first axis P, and the other four second holes 143 are also disposed in a ring array on an outer ring of the four second holes 143.

In the foregoing solution, the plurality of second holes 143 are spaced around the center hole 124, which can guide the electrolyte to evenly diffuse around the center hole 124 to fully enter the first tab 122, so that the electrolyte fully and quickly infiltrates the electrode assembly 12.

As shown in FIG. 8, in some embodiments of the present application, a projection of the protrusion 18 on the first current collecting member 14 does not overlap with the second hole 143.

Specifically, the protrusion 18 does not overlap with a projection of the second hole 143 on the plane perpendicular to the first axis P.

The protrusions 18 and the second holes 143 may be spaced in the first direction R or spaced around the first axis P. For example, as shown in FIG. 8, in some embodiments of the present application, quantities of the protrusions 18 and the second holes 143 correspond one to one, with each protrusion 18 located on an outer side of the corresponding second hole 143, that is, on a side away from the first axis P in the first direction R.

In the foregoing solution, portions where the second holes 143 are formed are staggered with portions where the protrusions 18 are formed in the first current collecting member 14, which can guide the electrolyte smoothly into the second holes 143 without reducing the strength of the portions corresponding to the protrusions 18, thereby reliably forming the gap 19 between the first current collecting member 14 and the first wall 111.

Figure 9:
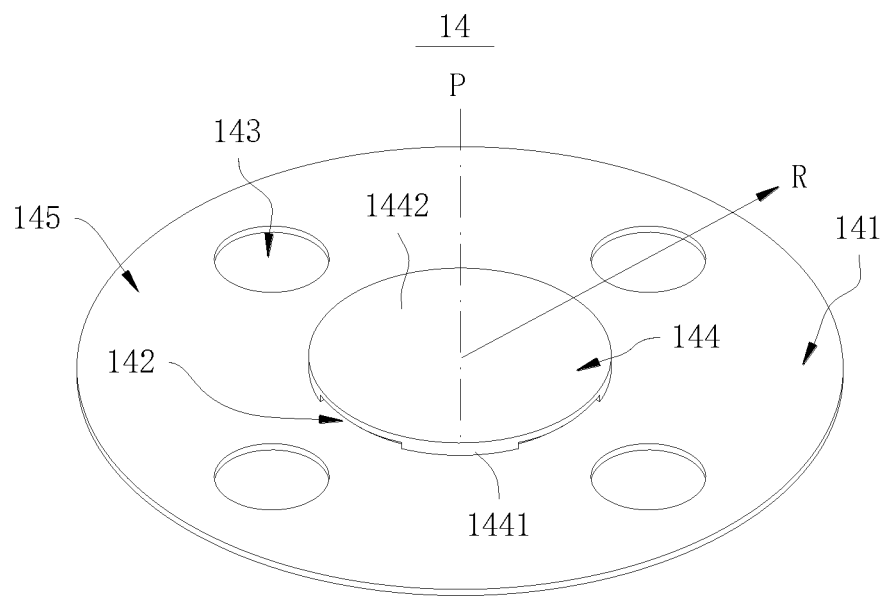
FIG. 9 shows a schematic structural diagram of another form of first current collecting member of a battery cell according to some embodiments of the present application.
Figure 10:
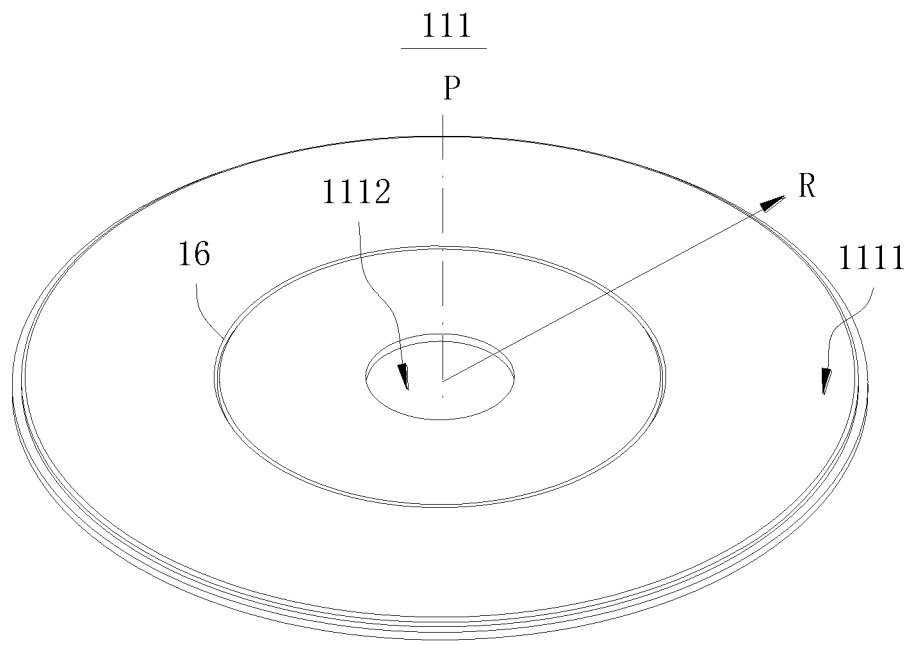
FIG. 10 shows a schematic structural diagram of a first wall paired with FIG. 9.

FIG. 9 shows a schematic structural diagram of another form of first current collecting member of a battery cell according to some embodiments of the present application; FIG. 10 shows a schematic structural diagram of a first wall paired with FIG. 9; and FIG. 11 shows a state diagram of fit between the first current collecting member in FIG. 9 and the first wall in FIG. 10.

Figure 11:
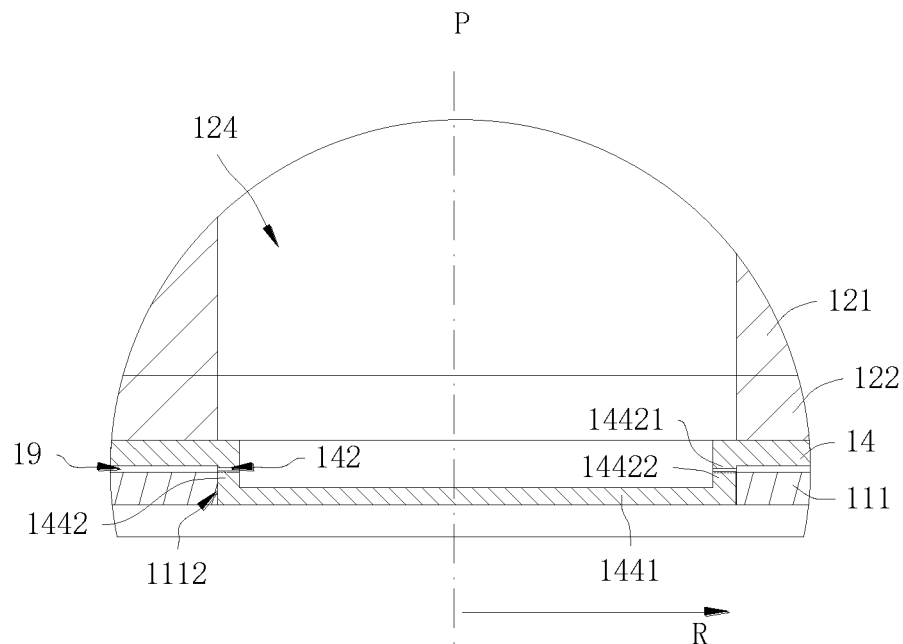
FIG. 11 shows a state diagram of fit between the first current collecting member in FIG. 9 and the first wall in FIG. 10.

As shown in FIGS. 9, 10, and 11, in some embodiments of the present application, the first wall 111 is provided with a third hole 1112, the first current collecting member 14 includes a center portion 144 and a surrounding portion 145, the surrounding portion 145 surrounds the center portion 144, the center portion 144 protrudes from the surrounding portion 145 in a direction away from the electrode assembly 12, at least a portion of the center portion 144 is inserted into the third hole 1112, and the center portion 144 is connected to a wall of the third hole 1112.

The third hole 1112 may be triangular, square, circular, elliptical, or the like. The center portion 144 inserted into the third hole 1112 matches the third hole 1112 in shape. For example, in some embodiments of the present application, the center portion 144 is cylindrical, and the third hole 1112 is circular.

The center portion 144 may be welded to the wall of the third hole 1112 to ensure a sealing performance of the battery cell 10 and an overcurrent capacity of the first current collecting member 14 and the first wall 111. The second holes 143 and the protrusions 18 are both disposed at the surrounding portion 145, and the surrounding portion 145 is connected to the first tab 122.

An axial direction of the third hole 1112 may coincide with the first axis P, that is, the center hole 124 and the first hole 142 are concentric, so that a center of gravity of the battery cell 10 is located on the first axis P, which is conducive to stable placement of the battery cell 10; or the axial direction of the third hole 1112 may alternatively deviate from the first axis P to make reasonable use of the space inside the battery cell 10.

In the foregoing solution, at least a portion of the center portion 144 is connected to the wall of the third hole 1112, so that the first current collecting member 14 can be electrically connected to the first wall 111 through the coordination between the center portion 144 and the third hole 1112.

As shown in FIGS. 9, 10, and 11, in some embodiments of the present application, the center portion 144 includes a top wall 1441 and a side wall 1442, the side wall 1442 is disposed on a periphery of the top wall 1441, the side wall 1442 connects the surrounding portion 145 and the top wall 1441, the first hole 142 is disposed on the side wall 1442 and in communication with the gap 19, and a peripheral surface of the side wall 1442 is connected to the wall of the third hole 1112.

The peripheral surface of the side wall 1442 refers to a peripheral surface, surrounding the first axis P, of the center portion 144.

The side wall 1442 includes a first portion 14421 and a second portion 14422 connected along the first axis P, the first portion 14421 is connected to the surrounding portion 145, one end of the second portion 14422 is connected to the first portion 14421, and the other portion of the second portion 14422 is connected to the top wall 1441. The first portion 14421 is in communication with the gap 19, the second portion 14422 is connected to the wall of the third hole 1112, and the first hole 142 is disposed on the side wall 1442.

A normal direction of the top wall 1441 extends along the first axis P. A normal direction of the side wall 1442 may extend in the first direction R, and the axial direction of the first hole 142 may extend in the first direction R. Alternatively, the normal direction of the side wall 1442 may be inclined with respect to both the first direction R and the first axis P, and the axial direction of the first hole 142 extends in the normal direction of side wall 1442.

The first portion 14421 and the second portion 14422 may have the same diameter, and a length of the second portion 14422 along the first axis P is limited by a height of the protrusion 18; or the diameter of the first portion 14421 may alternatively be greater than that of the second portion 14422, and a step is formed at the junction between the first portion 14421 and the second portion 14422 to limit the length of the second portion 14422 along the first axis P.

In the foregoing solution, the first hole 142 is disposed on the side wall 1442 of the center portion 144, and the electrolyte in the center hole 124 enters the gap 19 radially along the center hole 124 through the first hole 142 to fully and quickly infiltrate the electrode assembly 12.

In some embodiments of the present application, a ratio of a diameter of the center portion 144 to a diameter of the first current collecting member 14 is greater than or equal to 0.3.

As shown in FIG. 9 and FIG. 10, the center portion 144 is cylindrical, the first current collecting member 14 is disc-shaped, a central axis of the center portion 144 coincides with or is parallel to the first axis P, and a central axis of the first current collecting member 14 coincides with the central portion 144.

In the foregoing solution, the ratio of the diameter of the center portion 144 to the diameter of the first current collecting member 14 is greater than or equal to 0.3, which can achieve a good overcurrent capacity when the center portion 144 is attached to the wall of the third hole 1112, and achieve a reliable electrical connection between the first current collecting member 14 and the first wall 111.

In other embodiments, the center portion 144 may alternatively be a cube, a cuboid, an elliptical cylinder, or the like.

Figure 12:
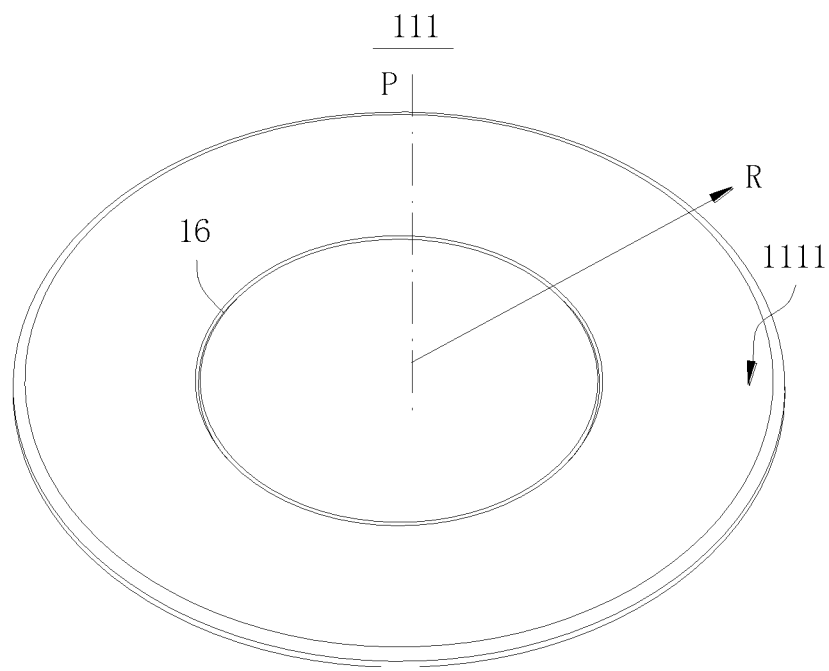
FIG. 12 shows a schematic structural diagram of a first wall paired with the first current collecting member in FIG. 8.

FIG. 12 shows a schematic structural diagram of a first wall paired with the first current collecting member in FIG. 8.

As shown in FIG. 8 and FIG. 12, in other embodiments, the first current collecting member 14 may alternatively be a flat structure, and the first current collecting member 14 abuts against the first wall 111 through the protrusions 18 to achieve an electrical connection (as shown in FIG. 5). A ratio of a top surface area of the protrusion 18 (namely, an area of abutment against the first surface 1111 or the second surface 141) to an area of the first current collecting member 14 (namely, a projected area on the plane perpendicular to the first axis P) is greater than 0.05.

As shown in FIG. 3 and FIG. 4, in some embodiments of the present application, the shell 11 further includes a second wall 112 opposite to the first wall 111, a second tab 123 is provided on a side, facing the second wall 112, of the electrode assembly 12, and the battery cell 10 further includes an electrode terminal 13 which is insulated on the second wall 112 and electrically connected to the second tab 123.

Based on the foregoing implementation of the first wall 111 as the end cover, the second wall 112 is a bottom wall of the shell body. The second wall 112 is provided with an electrode lead-out hole for leading out the electrode terminal 13, and a peripheral surface of the electrode terminal 13 and a wall of the electrode lead-out hole are insulated and isolated through an insulating ring 132.

In the foregoing solution, the electrode terminal 13 is insulated on the second wall 112, the electrode terminal 13 and the first wall 111 are located on two opposite sides of the shell 11 separately, and the battery cell 10 is electrically connected to the outside through the electrode terminal 13.

As shown in FIG. 3 and FIG. 4, in some embodiments of the present application, the battery cell 10 further includes a second current collecting member 15, which is disposed between the electrode assembly 12 and the second wall 112 and used for connecting the second tab 123 and the electrode terminal 13.

In the foregoing solution, the second tab 123 is connected to the electrode terminal 13 through the second current collecting member 15, which can simplify the structure of the electrode terminal 13 and the assembly process of the electrical connection between the second tab 123 and the electrode terminal 13.

As shown in FIG. 3 and FIG. 4, in some embodiments of the present application, the electrode terminal 13 is provided with a liquid injection hole 131, which is opposite to the center hole 124.

Specifically, the liquid injection hole 131 is opposite to the second end 1242 of the center hole 124, and the electrolyte may enter the interior of the battery cell 10 from the liquid injection hole 131 and then enter the center hole 124 from the second end 1242 of the second hole 143.

In the foregoing solution, the liquid injection hole 131 is integrated at the electrode terminal 13, which can simplify the structure of the shell 11; and the liquid injection hole 131 and the gap 19 are located on two axial sides of the center hole 124 separately, and the electrolyte entering the center hole 124 from the liquid injection hole 131 may first diffuse to the electrode assembly 12 through the center hole 124 and then enter the electrode assembly 12 through the gap 19, thereby improving the infiltration efficiency of the electrolyte.

As shown in FIG. 3 and FIG. 4, in some embodiments of the present application, the battery cell 10 further includes a sealing member 17 for sealing the liquid injection hole 131.

In the foregoing solution, after the electrolyte is injected, the sealing member 17 is used to seal the liquid injection hole 131, which can ensure the sealing property of the battery cell 10 and improve the safety performance of the battery cell 10.

As shown in FIG. 3 and FIG. 4, in some embodiments of the present application, the battery cell 10 further includes a pressure relief portion 16 disposed on the first wall 111, and the pressure relief portion 16 is configured to activate when the temperature or pressure inside the battery cell 10 reaches a threshold, so as to release the pressure inside the battery cell 10.

The pressure relief portion 16 may be a rupture disc, and may be formed through a weak area on the first wall 111. In some embodiments of the present application, a recessed portion is provided on the first surface 1111 of the first wall 111, and the recessed portion is ring-shaped around the first axis P.

In the foregoing solution, the pressure relief portion 16 is disposed on the first wall 111 to improve the safety performance of the battery cell 10.

As shown in FIG. 3 and FIG. 4, in some embodiments of the present application, the shell 11 includes a shell body and an end cover, the shell body has an opening, and the end cover is used for closing the opening, where the first wall 111 is the end cover.

In the foregoing solution, the first wall 111 is the end cover, and the first current collecting member 14 is disposed between the electrode assembly 12 and the end cover, whereby the electrode assembly 12 and the first current collecting member 14 assembled into a whole can be placed in the shell body first, then the opening is closed by the end cover, and the assembly process of the battery cell 10 is simplified accordingly.

Some embodiments of the present application provide a battery 100, including the battery cell 10.

Some embodiments of the present application provide a power consumption apparatus, including the battery 100.

Figure 13:
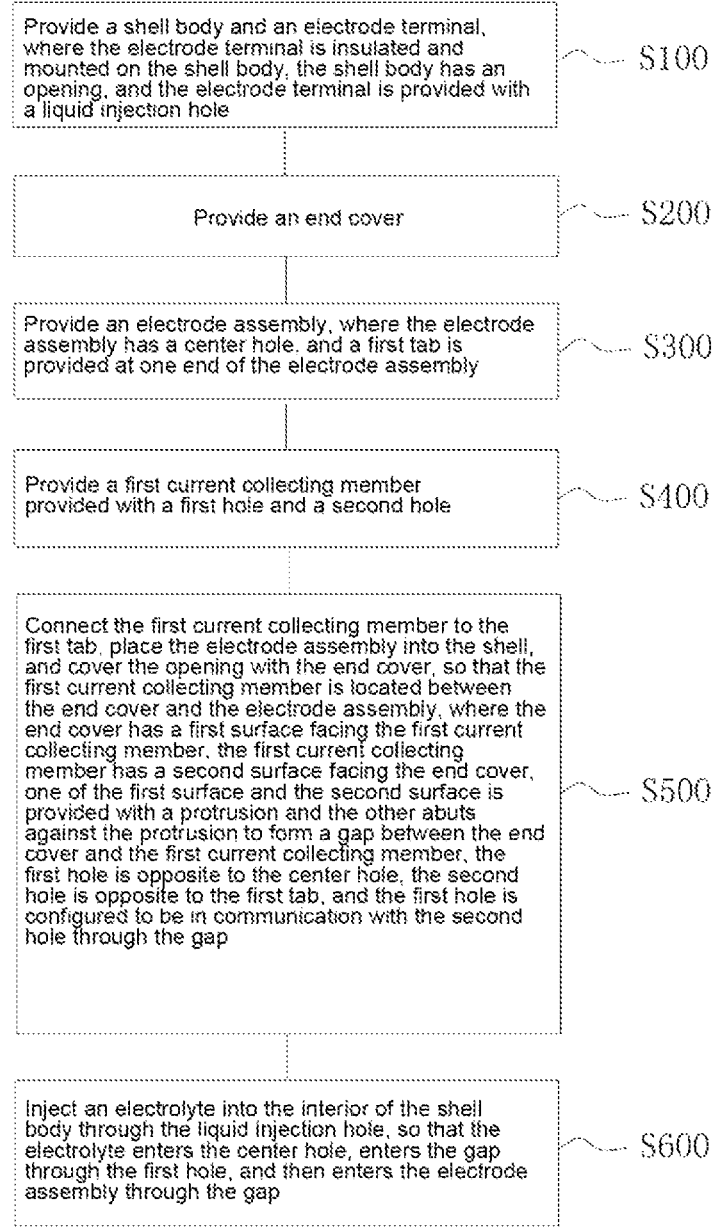
FIG. 13 shows a process flowchart of a battery cell manufacturing method according to some embodiments of the present application.

FIG. 13 shows a process flowchart of a battery cell manufacturing method according to some embodiments of the present application.

As shown in FIG. 13, some embodiments of the present application provide a battery cell manufacturing method, including:

S100: Provide a shell body and an electrode terminal 13, where the electrode terminal 13 is insulated and mounted on the shell body, the shell body has an opening, and the electrode terminal 13 is provided with a liquid injection hole 131;

S200: Provide an end cover;

S300: Provide an electrode assembly 12, where the electrode assembly 12 has a center hole 124, and a first tab 122 is provided at one end of the electrode assembly 12;

S400: Provide a first current collecting member 14 provided with a first hole 142 and a second hole 143;

S500: Connect the first current collecting member 14 to the first tab 122, place the electrode assembly 12 into the shell body, and cover the opening with the end cover, so that the first current collecting member 14 is located between the end cover and the electrode assembly 12, where the end cover has a first surface 1111 facing the first current collecting member 14, the first current collecting member 14 has a second surface 141 facing the end cover, one of the first surface 1111 and the second surface 141 is provided with a protrusion 18 and the other abuts against the protrusion 18 to form a gap 19 between the end cover and the first current collecting member 14, the first hole 142 is opposite to the center hole 124, the second hole 143 is opposite to the first tab 122, and the first hole 142 is configured to be in communication with the second hole 143 through the gap 19; and S600: Inject an electrolyte into the interior of the shell body through the liquid injection hole 131, so that the electrolyte enters the center hole 124, enters the gap 19 through the first hole 142, and then enters the electrode assembly 12 through the gap 19.

Figure 14:
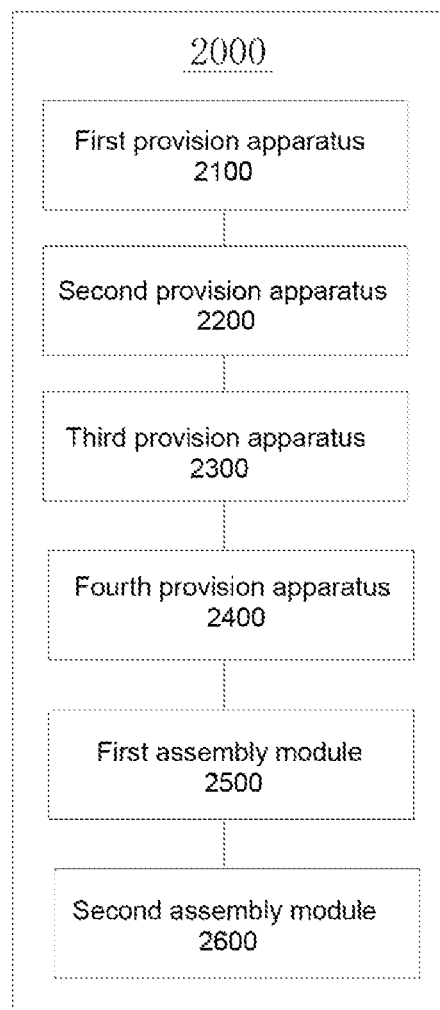
FIG. 14 shows a schematic structural diagram of a battery cell manufacturing device according to some embodiments of the present application.

FIG. 14 shows a schematic structural diagram of a battery cell manufacturing device according to some embodiments of the present application.

As shown in FIG. 14, the battery cell manufacturing device 2000 according to some embodiments of the present application includes:

a first provision apparatus 2100, configured to provide a shell body and an electrode terminal 13, where the electrode terminal 13 is insulated and mounted on the shell body, the shell body has an opening, and the electrode terminal 13 is provided with a liquid injection hole 131;

a second provision apparatus 2200, configured to provide an end cover;

a third provision apparatus 2300, configured to provide an electrode assembly 12, where the electrode assembly 12 has a center hole 124, and a first tab 122 is provided at one end of the electrode assembly 12;

a fourth provision apparatus 2400, configured to provide a first current collecting member 14 provided with a first hole 142 and a second hole 143;

a first assembly module 2500, configured to connect the first current collecting member 14 to the first tab 122, place the electrode assembly 12 into the shell body, and cover the opening with the end cover, so that the first current collecting member 14 is located between the end cover and the electrode assembly 12, where the end cover has a first surface 1111 facing the first current collecting member 14, the first current collecting member 14 has a second surface 141 facing the end cover, one of the first surface 1111 and the second surface 141 is provided with a protrusion 18 and the other abuts against the protrusion 18 to form a gap 19 between the end cover and the first current collecting member 14, the first hole 142 is opposite to the center hole 124, the second hole 143 is opposite to the first tab 122, and the first hole 142 is configured to be in communication with the second hole 143 through the gap 19; and a second assembly module 2600, configured to inject an electrolyte into the interior of the shell body through the liquid injection hole 131, so that the electrolyte enters the center hole 124, enters the gap 19 through the first hole 142, and then enters the electrode assembly 12 through the gap 19.

As shown in FIGS. 1 to 14, some embodiments of the present application provide a battery cell 10, including a shell 11, an electrode assembly 12, an electrode terminal 13, a first current collecting member 14, a second current collecting member 15, a pressure relief portion 16, a sealing member 17, and an insulating ring 132. The first current collecting member 14 is a negative current collecting plate, and the second current collecting member 15 is a positive current collecting plate. The shell 11 includes a shell body and an end cover, the end cover is a first wall 111, the bottom wall of the shell body is a second wall 112, the first wall 111 and the second wall 112 are disposed opposite along a first axis P, and the electrode terminal 13 is disposed on the second wall 112 through the insulating ring 132. The electrode assembly 12 has a center hole 124 extending along the first axis P, a first tab 122 and a second tab 123 are separately provided at two ends of the electrode assembly 12 along the first axis P, the first tab 122 is electrically connected to the first wall 111 through the first current collecting member 14, and the second tab 123 is electrically connected to the electrode terminal 13 through the second current collecting member 15. The electrode terminal 13 is provided with a liquid injection hole 131, which is opposite to the center hole 124. The first wall 111 has a first surface 1111 facing the first current collecting member 14, the first current collecting member 14 has a second surface 141 facing the first wall 111, one of the first surface 1111 and the second surface 141 is provided with a protrusion 18, and the other abuts against the protrusion 18 to form a gap 19 between the first wall 111 and the first current collecting member 14; and the first current collecting member 14 is provided with a first hole 142 and a second hole 143, the first hole 142 is opposite to the center hole 124, the second hole 143 is opposite to the first tab 122, and the first hole 142 is configured to be in communication with the second hole 143 through the gap 19.

As shown in FIG. 6, in some embodiments of the present application, the protrusion 18 is disposed on the first surface 1111 of the first wall 111. As shown in FIG. 7, in other embodiments of the present application, the protrusion 18 is disposed on the second surface 141 of the first current collecting member 14.

As shown in FIG. 8 and FIG. 12, in some embodiments of the present application, the first current collecting member 14 is a flat structure, the first hole 142 is disposed in the center of the first current collecting member 14, and an axis of the first hole 142 is parallel to or coincides with the first axis P. The first current collecting member 14 abuts against the first wall 111 through a top surface of the protrusion 18, which not only forms the gap 19 but also achieves an electrical connection between the two. A ratio of a top surface area of the protrusion 18 (namely, an area of abutment against the first surface 1111 or the second surface 141) to an area of the first current collecting member 14 (namely, a projected area on the plane perpendicular to the first axis P) is greater than 0.05 to ensure an overcurrent capacity of the first current collecting member 14 and the first wall 111.

During injection, an electrolyte enters a first end 1241 of the center hole 124 from the liquid injection hole 131, enters the first hole 142 from a second end 1242 of the center hole 124 almost without changing the flow direction, enters the gap 19 from the first hole 142, and then enters the first tab 122 from the second hole 143 to fully and quickly infiltrate the electrode assembly 12.

As shown in FIGS. 9, 10, and 11, in other embodiments of the present application, the first wall 111 is provided with a third hole 1112, the first current collecting member 14 includes a center portion 144 and a surrounding portion 145, the surrounding portion 145 surrounds the center portion 144, and the center portion 144 protrudes from the surrounding portion 145 in a direction away from the electrode assembly 12. The center portion 144 includes a top wall 1441 and a side wall 1442, the side wall 1442 is disposed on a periphery of the top wall 1441, the side wall 1442 connects the surrounding portion 145 and the top wall 1441, at least a portion of the center portion 144 is inserted into the third hole 1112, and a peripheral surface of the side wall 1442 is welded to a wall of the third hole 1112 through a seam surrounding welding process. Under the abutment effect of the protrusion 18, a portion of the side wall 1442 is exposed in the gap 19, and this portion is provided with the first hole 142. A ratio of a diameter of the center portion 144 to a diameter of the first current collecting member 14 is greater than or equal to 0.3 to ensure an overcurrent capacity of the first current collecting member 14 and the first wall 111.

During injection, the electrolyte enters the first end 1241 of the center hole 124 from the liquid injection hole 131, enters the first hole 142 from the second end 1242 of the center hole 124, enters the gap 19 from the first hole 142 to change the flow direction from the first axis P to a first direction R, and then enters the first tab 122 from the second hole 143 to fully and quickly infiltrate the electrode assembly 12.

In the battery cell 10 according to the embodiments of the present application, the first hole 142 and the second hole 143 are formed on the first current collecting member 14, the protrusion 18 is formed on the first current collecting member 14 or the first wall 111, and the gap 19 is formed through the protrusion 18 to provide a passage for electrolyte diffusion, which can effectively improve a problem of poor electrolyte infiltration in existing designs. This simply improves only the existing first current collecting member 14 or first wall 111, so the improvement is low-cost and easy to implement, and can significantly improve the infiltration effect of the electrode assembly 12, improve the injection efficiency of the battery cell 10, and also improve the electric capacity and safety performance of the battery cell 10.

It should be noted that the features in the embodiments of the present application may be combined with each other on a non-conflict basis.

Described above are merely preferred embodiments of the present application, and the present application is not limited thereto. Various modifications and variations may be made to the present application for those skilled in the art. Any modifications, equivalent substitutions, improvements, and the like made within the spirit and principle of the present application shall fall within the protection scope of the present application.

What is claimed is:

1. A battery cell, comprising:
a shell with a first wall;
an electrode assembly disposed inside the shell, wherein the electrode assembly is formed with a center hole, and a first tab is provided on a side of the electrode assembly facing the first wall; and
a first current collecting member disposed between the first wall and the electrode assembly and configured for electrically connecting the first tab and the first wall, wherein
- the first wall has a first surface facing the first current collecting member, the first current collecting member has a second surface facing the first wall, one of the first surface of the first wall and the second surface of the first current collecting member is provided with a protrusion, and the other abuts against the protrusion to form a gap between the first wall and the first current collecting member; and
- the first current collecting member is formed with a first hole and a second hole, the first hole is opposite to the center hole of the electrode assembly, the second hole is opposite to the first tab, and the first hole is configured to be in communication with the second hole through the gap.

2. The battery cell according to claim 1, wherein a plurality of protrusions are spaced around the center hole of the electrode assembly.

3. The battery cell according to claim 1, wherein a plurality of second holes are spaced around the center hole of the electrode assembly.

4. The battery cell according to claim 1, wherein a projection of the protrusion on the first current collecting member does not overlap with the second hole.

5. The battery cell according to claim 1, wherein the first wall is formed with a third hole, the first current collecting member comprises a center portion and a surrounding portion, the surrounding portion surrounds the center portion, the center portion protrudes from the surrounding portion in a direction away from the electrode assembly, at least a portion of the center portion is inserted into the third hole, and the center portion is connected to a wall of the third hole.

6. The battery cell according to claim 5, wherein the center portion comprises a top wall and a side wall, the side wall is disposed on a periphery of the top wall, the side wall connects the surrounding portion and the top wall, the first hole is disposed on the side wall and in communication with the gap, and a peripheral surface of the side wall is connected to the wall of the third hole.

7. The battery cell according to claim 5, wherein a ratio of a diameter of the center portion to a diameter of the first current collecting member is greater than or equal to 0.3.

8. The battery cell according to claim 1, wherein the shell further comprises a second wall opposite to the first wall, a second tab is disposed on a side of the electrode assembly facing the second wall, and the battery cell further comprises:
- an electrode terminal, which is insulated on the second wall and electrically connected to the second tab.

9. The battery cell according to claim 8, wherein the battery cell further comprises:
- a second current collecting member, which is disposed between the electrode assembly and the second wall and configured for connecting the second tab and the electrode terminal.

10. The battery cell according to claim 8, wherein the electrode terminal is formed with a liquid injection hole, which is opposite to the center hole.

11. The battery cell according to claim 10, wherein the battery cell further comprises:
- a sealing member for sealing the liquid injection hole.

12. The battery cell according to claim 1, wherein the battery cell further comprises:
- a pressure relief portion disposed on the first wall, wherein the pressure relief portion is configured to activate when the temperature or pressure inside the battery cell reaches a threshold, so as to release the pressure inside the battery cell.

13. The battery cell according to claim 1, wherein the shell comprises a shell body and an end cover, the shell body has an opening, and the end cover is configured to close the opening, wherein the first wall is the end cover.

14. A battery, comprising the battery cell according to claim 1.

15. A power consumption apparatus, comprising the battery according to claim 14.

* * * * *